3,459,866
HYDROXAMATE CARBAMATES AS
NEMATOCIDES
James B. Buchanan, 599 Rockland Road,
Wilmington, Del. 19803
No Drawing. Continuation-in-part of application Ser. No.
484,121, Aug. 31, 1965. This application Aug. 31, 1967,
Ser. No. 664,632
Int. Cl. A01m 9/12; C07c 125/02
U.S. Cl. 424—327                                6 Claims

ABSTRACT OF THE DISCLOSURE

O-carbamylhydroxamate esters such as methyl O-(methylcarbamyl)thiolacetohydroxamate are effective in protecting a variety of plants from attack by plant-parasitic nematodes.

CROSS-REFERENCE TO RELATED APPLICATIONS

This application is a continuation-in-part of my copending application Ser. No. 484,121, filed Aug. 31, 1965, now abandoned.

BACKGROUND OF THE INVENTION

Plant-parasitic nematodes are unsegmented worms, largely under one-eighth of an inch in length. Most species occur in soil and many of them attack the roots and other underground parts of plants. Some, on the other hand, attack the crown, stem, leaves, buds or seeds of plants.

Plant-parasitic nematodes damage crops and reduce yields of useful produce in several ways. Some species, termed "ectoparasites," attack plants largely from the outside. Their feeding often results in the death of the rootlets involved. When the numbers of such nematodes are large, many rootlets are killed, and crops suffer by correspondingly reduced growth and limited yields. Other species, termed "endoparasites," enter and live within the root tissue. Both ectoparasitic and endoparasitic nematodes may cause the death of the tissue surrounding the point of attack as well as malformation of the plant part involved. Such effects not only reduce the general vigor of the plant, but, in many cases, actually destroy the market value of the produce (such as malformed carrots). Furthermore, damage caused by plant-parasitic nematodes may serve as entry points for other plant pathogens such as fungi, bacteria and viruses.

Crop losses in the United States alone due to plant-parasitic nematodes are estimated to be in the range of one-half to one billion dollars annually.

The two basic methods available for avoiding or mitigating nematode damage to crops are to increase fertilizer and water to offset stunted root systems or to apply chemicals to control the nematodes. The first method is expensive and only partially effective, especially when the nematode causes malformation of the produce. The second method, while more effective, has been hampered by the lack of suitable chemicals. Many of the chemicals now available for nematode control are exceedingly phytotoxic and therefore unsuitable for use on growing crops. Others are unpleasant to handle, temporary in action or excessively expensive.

I have discovered that the hydroxamate carbamates of this invention kill, repel or otherwise prevent the destructive effects of plant-parasitic nematodes when applied to such nematodes or to the site of their activity. The compositions of this invention possess physical characteristics which permit them to be placed at the site of nematode presence or activity readily and without disturbance of plants already established. Additionally, the compounds of this invention are safe to seeds and growing plants at and well above the useful rates, they can be easily and safely handled, they provide an extended period of protection and they are effective at economical, low rates.

SUMMARY OF THE INVENTION

In summary I have discovered methods of protecting plants from plant parasitic nematodes with O-carbamylhydroxamate esters of the formula:

(1) 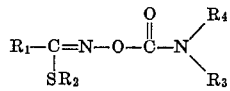

wherein
R$_1$ is alkyl of 1 through 4 carbon atoms, alkoxylalkyl of 2 through 5 carbon atoms, alkylthioalkyl of 2 through 5 carbons atoms, 4-halophenyl or benzoyl;
R$_2$ is alkyl of 1 through 4 carbon atoms;
R$_3$ is hydrogen, methyl, ethyl, propyl, allyl, butenyl or propargyl; and
R$_4$ is hydrogen or methyl.

DESCRIPTION OF THE INVENTION

This invention is directed to methods of protecting plants from nematodes by applying to the plants, the soil in which they are growing, and plant-parasitic nematodes in the locus of the plants, a protectant amount of a compound of Formula 1. The term nematode as used herein includes eggs, larvae, and adult plant parasitic members of the phylum Nemata unless otherwise noted.

Compounds of Formula 1 are particularly effective in protecting plants from nematodes represented by, but not limited to, the following:

Aphelenchoides species, bud and leaf nematode
Anguina tritici, wheat nematode
Anguina agrostis, grass nematode
Belonolaimus species, sting nematode
Criconemoides species, ring nematodes
Ditylenchus destructor, potato rot nematode
Ditylenchus dipsaci, stem and bulb nematode
Ditylenchus angustus, rice nematode
Dolichodorus heterocephalus, awl nematode
Helicotylenchus buxophilus, spiral nematode
Heterodera rostochiensis, golden nematode
Heterodera tabacum, tobacco cyst nematode
Heterodera schachtii, sugar beet nematode
Heterodera carotae, carrot root nematode
Heterodera gottingiana, pea root nematode
Heterodera glycines, soybean cyst nematode
Hoplolaimus species, lance nematodes
Meloidogyne incognita, southern root-knot nematode
Meloidogyne haple, northern root-knot nematode
Meloidogyne arenaria, peanut root-knot nematode
Meloidogyne exigua, coffee root-knot nematode
Pratylenchus brachyurus, smooth-headed lesion nematode
Pratylenchus pratensis, meadow nematode
Pratylenchus musicola, banana nematode
Pratylenchus zeae, corn nematode
Radopholus similus, burrowing nematode
Rotylenchus reniformis, kidney-shaped nematode
Trichodorus species, stubby root nematodes
Tylenchorhynchus claytoni, tobacco stunt nematode
Xiphinema diversicaudatum, dagger nematode Generally speaking, the compounds of Formula 1 in which R$_3$ is methyl and R$_4$ is hydrogen are preferred because of their excellent activity against nematodes.

Particularly preferred compounds of Formular 1, because of their high order of activity against nematodes, are the following:

Methyl O-(methylcarbamyl)thiolacetohydroxamate
Methyl O-(dimethylcarbamyl)thiolacetohydroxamate Sec-butyl O-(dimethylcarbamyl)thioacetohydroxamate
Methyl O-(methylcarbamyl)thiopropionohydroxamate
Methyl O-(methylcarbamyl)-2-methoxythiolacetohydroxamate
Methyl O-(methylcarbamyl)-2-(methylthio)thiolacetohydroxamate
Methyl O-(propylcarbamyl)thiolacetohydroxamate
Methyl O-(allylcarbamyl)thiolacetohydroxamate
Methyl O-(ethylcarbamyl)thiolacetohydroxamate
Methyl O-(carbamyl)thiolacetohydroxamate
Ethyl O-(methylcarbamyl)thiolacetohydroxamate
Methyl O-(methylcarbamyl)-p-chlorothiolbenzohydroxamate
Methyl O-(methylcarbamyl)-p-fluorothiolbenzohydroxamate
Methyl O-(methylcarbamyl-p-bromothiolbenzohydroxamate
Methyl O-(methylcarbamyl)thiolbutyrohydroxamate
Isopropyl O-(methylcarbamyl)thiolisobutyrohydroxamate

PREPARATION

The O-carbamylhydroxamate esters of Formula 1 are prepared by treating a thiolyhydroxamate ester with sodium hydride in tetrahydrofuran, adding the resulting sodium salt to a solution of phosgene, and then treating the chloroformate intermediate with two equivalents of ammonia. The method is illustrated by the following equations:

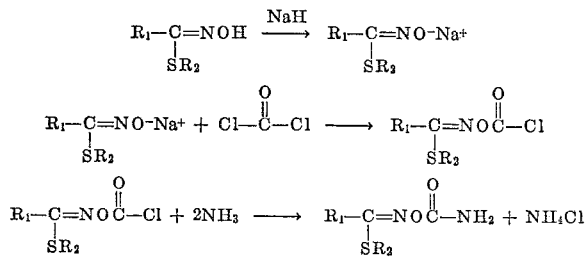

wherein $R_1$ and $R_2$ have the same meaning as above.

O-carbamylthiohydroxamates of Formula 1 can also be prepared by reacting a thiolhydroxamate with an alkali metal cyanate and trifluoroacetic acid in an inert solvent such as benzene. This reaction is illustrated by the equation

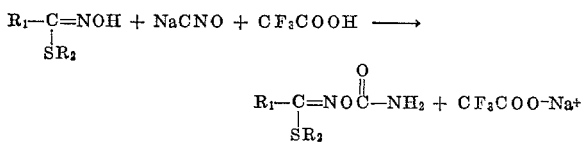

wherein $R_1$ and $R_2$ have the same meaning as above.

The thiolhydroxamate ester intermediate required in the above method of synthesis can be prepared through reaction of an imino ether hydrochloride with hydroxylamine using conditions previously described in the literature. See, for example, Ber., 46, 3619 (1913); Ber., 59, 2395 (1926); Ber., 69, 2352 (1936). Thiolhydroxamate esters can also be prepared by chlorination of an aldoximine in an inert solvent to form the corresponding hydroxamyl chloride as shown in Ber., 27, 2197, (1894), followed by reaction of the latter with the alkali metal salt of an alkyl mercaptan.

The O-alkylcarbamylhydroxamate esters of the invention are prepared by treating a thiolhydroxamate ester prepared as described with an alkyl isocyanate in a small amount of "Dabco"®, 1,4-diazabicyclo[2,2,2]octane, is present as a catalyst. This method is illustrated by the following equation:

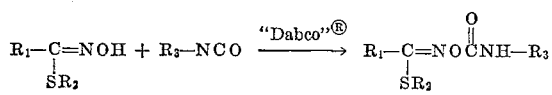

wherein $R_1$, $R_2$ and $R_3$ have the same meaning as above.

The O-dialkylcarbamylhydroxamate esters of this invention can be prepared by treating a thiolhydroxamate ester with sodium hydride in tetrahydrofuran and treating the resulting sodium salt with a dialkylcarbamyl chloride. This method is illustrated by the following equations:

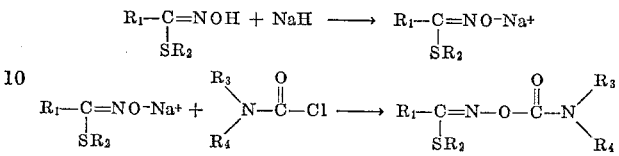

where $R_1$, $R_2$, $R_3$ and $R_4$ have the same meaning as above.

The compounds of this invention, represented generally by the above Formula 1 can exist as syn- and anti-isomers or as mixtures of the respective isomers.

COMPOSITIONS

Compositions of this invention suitable for practical use as nematocides will include one or more compounds of Formula 1 above, and can include surface-active agents solid or liquid diluents and other materials as desired to produce wettable powders, suspensions, emulsifiable concentrates, dusts, solutions, pellets, granules, or high strength compositions.

The surface-active agents, or surfactants as they are sometimes called, used in the compositions of this invention act as wetting, dispersing and emulsifying agents which will assist dispersion of the active material in a spray. Additionally, the surfactants act as spreaders which aid in obtaining even coverage of the surfaces to be protected. The surfactants can include such anionic, non-ionic and cationic agents as have been used heretofore in nematocidal compositions of similar type. A detailed list of such agents may be found in "Detergents and Emulsifiers, 1965 Annual," by John W. McCutcheon, Inc.

Anionic and nonionic surfactants are preferred. Among the anionic surfactants, preferred ones are alkali and alkaline earth salts of alkylarylsulfonic acid, e.g. dodecylbenzenesulfonates and alkylnaphthalenesulfonates, oil-soluble petroleum sulfonates, dialkyl sodium sulfosuccinate esters, sodium lauryl sulfate, sodium N-methyl-N-oleoyltaurate, sodium dodecyldiphenyl ether disulfonate and the oleic acid ester of sodium isethionate. Among the nonionic surfactants, preferred ones are ethylene oxide condensates with alkylated phenols, sorbitan fatty esters and long chain alcohols or mercaptans, as well as polyoxyethylene esters of fatty acids.

Preferred dispersants are alkali and alkaline earth salts of ligninsulfonic acids, salts of polymerized alkylarylsulfonates which are sold under the "Daxad"® and "Darvan"® trademarks, as well as methylcellulose, polyvinyl alcohol and the like.

Surfactants are present in compositions of my invention at the rate of 0.1 to 15% by weight based on the total weight of the resulting nematocidal composition.

The composition can contain, with or without a surfactant, a finely divided solid diluent such as natural silicates, e.g., talc, sepiolite, pyrophyllite; clays, e.g., montmorillonite, kaolinite, attapulgite; diatomaceous earth; synthetic magnesium silicate; synthetic silicas; calcium silicate; calcium sulfate; calcium carbonate; calcium phosphate; and flours derived from natural sources such as walnut shell, redwood, cottonseed and the like. The finely divided solid will be present in the compositions of this invention at a concentration of 5 to 98% by weight based on the total weight of the resulting nematocidal composition.

Organic liquids suitable for the preparation of solutions, suspensions and emulsifiable concentrates include paraffinic hydrocarbons, aromatic hydrocarbons and halogenated hydrocarbons, although ketones, esters and amides can also be used. Depending upon the solubility of the particular compound in question, aqueous suspensions or solutions can be prepared.

In general, suspension formulations are preferred if the solubility of the active ingredient in the liquid carrier is less than about 0.1%.

An organic liquid suitable for the compositions of this invention will be present in the range of 20 to 98% by weight based on the total weight of the nematocidal composition. Additional modifiers can be advantageous. Although the compounds of Formula 1 are quite stable under most conditions, the use of a desiccant, buffering agent or materials such as urea, which inactivate catalytic sites on diluent particles can prove desirable. Additives which will inhibit corrosion, reduce foam, reduce caking and increase flocculation can also be used. In aqueous solutions or suspensions, bactericides, fungicides, bacteriostats and fungistats are frequently desirable.

The bactericides, fungicides, bacteriostats and fungistats will be present in compositions of this invention at the rate of 1 to 4 parts by weight for each 1 part by weight of compound of Formula 1.

Compositions of this invention can additionally contain known insecticides, miticides, fungicides, seed treatments, fertilizers, nutrients, and other nematocides of which the following are illustrative:

1,2,3,4,10,10-hexachloro-1,4,4a,5,8,8a-hexahydro-1,4-endoexo-5,8-dimethanonaphthalene;
1,2,3,4,5,6-hexachlorocyclohexane;
2,3,4,5,6,7,8,8-octachloro-4,7-methano-3a,4,7,7a-tetrahydroindane;
1,1,1-trichloro-2,2-bis(p-chlorophenyl)ethane;
1,2,3,4,10,10-hexachloro-6,7-epoxy-1,4,4a,5,6,7,8,8a-octahydro-1,4-endoexo-5,8-dimethanonaphthalene;
1,2,3,4,10,10-hexachloro-6,7-epoxy-1,4,4a,5,6,7,8,8a-octahydro-1,4-endoendo-5,6-dimethanonaphthalene;
1(or 3a),4,5,6,7,8,8-heptachloro-3a,4,7,7a-tetrahydro-4,7-methanoindene;
1,1,1-trichloro-2,2-bis(p-methoxyphenyl)ethane;
1,1-dichloro-2,2-bis(p-chlorophenyl)ethane;
Chlorinated camphene having a chlorine content of 67–69%;
2-nitro-1,1-bis(p-chlorophenyl)butane;
1-naphthyl-N-methylcarbamate;
Methylcarbamic acid, ester with phenol, 4-(dimethylamino)3,5-dimethyl;
Methylcarbamic acid, ester with 1,3-dithiolan-2-one oxime;
O,O-diethyl-O-[2-isopropyl-4-methylpyrimid-6-yl] thiophosphate;
O,O-dimethyl-1-hydroxy-2,2,2-trichloroethylphosphonate;
O,O-dimethyl-S-(1,2-dicarbethoxyethyl)dithiophosphate;
O,O-dimethyl-O-p-nitrophenylthiophosphate;
O,O-diethyl-O-p-nitrophenylthiophosphate;
O,O-dimethyl-O-(3-chloro-4-nitrophenyl)thiophosphate;
dl-2-cyclopentenyl-4-hydroxy-3-methyl-2-cyclopenten-1-one chrysanthemate;
O,O-dimethyl-O-(2,2-dichlorovinyl)phosphate;
Mixture containing 53.3% "Bulan," 26.7% "Prolan" and 20.0% related compounds;
O,O-dimethyl-O-(2,4,5-trichlorophenyl) phosphorothioate;
O,O-dimethyl-S-(4-oxo-benzotriazine-3-methyl) phosphorodithioate;
Bis(dimethylamino)phosphonous anhydride;
O,O-diethyl-O-(2-keto-4-methyl-7a′-pyranyl) thiophosphate;
O,O-diethyl (S-ethyl mercaptomethyl)dithiophosphate;
Calcium arsenate;
Sodium aluminofluoride;
Dibasic lead arsenate;
2′-chloroethyl-1-methyl-2-(p-tert-butylphenoxy)ethyl sulfite;
Azobenzene;
Ethyl 2-hydroxy-2,2-bis(4-chlorophenyl)acetate;
O,O-diethyl-O-[2-(ethylmercapto)ethyl]thiophosphate;
2,4-dinitro-6-sec-butyl phenol;
O-ethyl O-p-nitrophenylbenzenethiophosphonate;
4-chlorophenyl-4-chlorobenzene sulfonate;
p-Chlorophenyl-phenylsulfone;
Tetraethyl pyrophosphate;
1,1-bis(p-chlorophenyl)ethanol;
1,1-bis(chlorophenyl)-2,2,2-trichloroethanol;
p-Chlorophenyl-p-chlorobenzyl sulfide;
Bis(p-chlorophenoxy)methane;
3-(1-methyl-2-pyrrolidyl)pyridine;
Mixed esters of pyrethrolone and cinerolone keto-alcohols and two chrysanthemum acids;
Cube and derris, both whole root and powdered;
Ryanodine;
Mixture of alkaloids known as veratrine;
dl-2-allyl-4-hydroxy-3-methyl-2-cyclopenten-1-one esterified with a mixture of cis and trans-dl-chrysanthemum monocarboxylic acids;
Butoxypolypropylene glycol;
p-Dichlorobenzene;
2-butoxy-2′-thiocyanodiethyl ether;
Naphthalene;
1,1-dichloro-2,2-bis(p-ethylphenyl)ethane;
p-Dimethylaminobenzenediazo sodium sulfonate;
Quinone oxyaminobenzooxohydrazone;
Tetraalkyl thiuram sulfides such as tetramethyl thiuram, monosulfide or disulfide and tetraethyl thiuram monosulfide or disulfide;
Metal salts of ethylene bisdithiocarbamic acid, e.g., manganese, zinc, iron and sodium salts;
Pentachloronitrobenzene;
Dodecylguanidine acetate;
N-trichloromethylthiotetrahydrophthalimide (captan);
Phenylmercury acetate;
2,4-dichloro-6-(o-chloroaniline)-s-triazine;
N-methylmercury p-toluenesulfonanilide;
Chlorophenolmercury hydroxides;
Nitrophenolmercury hydroxides;
Ethylmercury acetate;
Ethylmercury 2,3-dihydroxypropyl mercaptide;
Methylmercury acetate;
Methylmercury 2,3-dihydroxypropyl mercaptide;
3,3′-ethylenebis(tetrahydro-4,6-dimethyl-2H-1,3,5-thiadiazine-2-thione);
Methylmercury dicyandiamide;
N-ethylmercury-p-toluenesulfonanilide;
Metal (e.g., iron, sodium and zinc), ammonium and amine salts of dialkyl dithiocarbamic acids;
Tetrachloronitroanisole;
Hexachlorobenzene;
Hexachlorophene;
Methylmercury nitrile;
Tetrachloroquinone;
N-trichloromethylthiophthalimide;
1,2-dibromo-3-chloropropene;
1,2-dibromo-3-chloropropane;
Dichloropropane-dichloropropene mixture;
Ethylene dibromide;
Chloropicrin;
Sodium dimethyl dithiocarbamate;
1,4-dichloro-2,5-dimethoxybenzene; and
2-(carboxyamino)-1-benzimidazolecarboxylic acid, dimethyl ester.

The compositions of the invention can be prepared by methods generally used for pesticidal compositions of similar type. The solid compositions, with the exception of granules, are prepared in a blending operation and will usually include passage through a grinder such as an attrition mill, a hammer mill or a fluid energy mill.

Solutions are prepared by stirring the combined ingredients. In some cases warming may speed solution and in others cooling or pressure may be required to prevent evaporation of the solvent. Aqueous and oil suspensions are prepared by mixing the insoluble active ingredient and other ingredients and ballmilling or sand grinding the mixture to produce a concentrated slurry of very finely divided particles.

Granules are prepared by different procedures. Preformed, absorptive granules are sprayed with a solution of active ingredient and adjuvants, or with a mixture of active ingredient and adjuvant which have been warmed as needed to produce a free-flowing liquid. Alternatively, the active ingredient and solid diluents are mixed with sufficient liquid to permit the extrusion of pellets or the formation of granules by tumbling.

Particularly preferred compositions of this invention because of exceptionally good residual activity are formulations of the compounds of Formula 1 with low molecular weight indene polymers and indene copolymers with phenol and coumarone such as disclosed in copending application Ser. No. 469,835, filed July 6, 1965.

Another group of particularly preferred compositions of this invention are formulations of the compounds of Formula 1 containing in addition a fungicide such as those listed above. Such compositions are preferred because of the type of association which exists between nematodes and fungi in their attack on plants.

APPLICATION

In applying the compounds of Formula 1 for nematode control, the compound is of course applied in an amount sufficient to exert the desired action. The required amount, however, will be governed by such variables as method of application, area of application, time of year, temperature, moisture and the like.

The compositions of this invention can be applied to the soil prior to or during the planting of the crop to be protected. Use rates for this type of application range from about 0.1 to about 40 pounds af active ingredient per acre of surface actually treated. For reasons of economy and effectiveness rates of 0.5 to 20 pounds per acre are preferred. Also preferred for this type of application are the less water-soluble compositions of Formula 1. The more water-soluble compositions of Formula 1 are most effectively used to control nematodes by applying them so that they will be carried by rainfall or irrigation water into the root zone of the plants to be protected. In such treatment the rates of application will be the same as those described above.

Other methods of applying the O-carbamylhydroxamate esters of Formula 1 to protect plants include: (a) spraying above-ground parts of plants, such as stems, leaves or buds in which nematodes are already present or where later attack is possible; (b) dipping or soaking in a water suspension, solution or emulsion of the active ingredient, reproductive parts such as seeds, cane pieces or bulbs which are already infested or which will be planted in plant parasitic nematode infested soil; or (c) immersing the root system or entire plant of nursery stock or transplants in a water suspension, solution or emulsion of the active ingredient to disinfect the plant and provide residual protection against subsequent nematode invasion. The concentration of active ingredient in such sprays or dips is between 0.0001 and 20 pounds per 100 gallons of water, and preferably between 0.001 and 10 pounds per 100 gallons of water.

The following illustrative examples are provided in addition to those above to more fully describe the invention. Parts and percentages are by weight unless otherwise noted.

Example 1

To a stirred suspension of 48 parts of 50% sodium hydride in mineral oil and 1170 parts of tetrahydrofuran is added in portions 105 parts of methyl thiolacetohydroxamate. The resulting sodium salt suspended in tetrahydrofuran is added in portions to 297 parts of phosgene in 1420 parts of ethyl ether maintained at 0–5° C. The excess phosgene is removed by distillation at reduced pressure. The resulting mixture is added in portions to 34 parts of ammonia dissolved in 1050 parts of acetonitrile maintained at 0–10° C. After warming to ambient temperature the solids are filtered off and the filtrate is extracted with hexane to remove mineral oil. The solvent is then removed yielding methyl O-(carbamyl) thiolacetohydroxamate.

The following compounds can be prepared by the procedure of Example 1 by substituting an equivalent weight of the indicated starting material for the methyl thiolacetohydroxamate.

| Starting material | Product |
| --- | --- |
| Methyl thiolbutyrohydroxamate | Methyl O-(carbamyl)thiolbutyrohydroxamate. |
| Methyl 2-oxo-2-phenylthiolacetohydroxamate. | Methyl O-(carbamyl)2-oxo-2-phenylthiolacetohydroxamate. |
| Isopropyl thiolisobutyrohydroxamate. | Isopropyl O-(carbamyl) thiolisobutyrohydroxamate. |

Example 2

To a stirred solution composed of 105 parts of methyl thiolacetohydroxamate and 2 parts of 1,4-diazabicyclo [2,2,2]octane in 1000 parts of benzene is added 65 parts of methyl isocyanate. After addition, the reaction mixture is heated at 40–50° C. for one hour. The solvent is removed under reduced pressure yielding methyl O-(methylcarbamyl)thiolacetohydroxamate as a white solid.

The following compounds can be prepared by the procedure of Example 2 by substituting an equivalent weight of the indicated starting material for the methyl thiolacetohydroxamate.

| Starting material | Product |
| --- | --- |
| n-Butyl thiolacetohydroxamate | n-Butyl O-(methylcarbamyl)-thiolacetohydroxamate. |
| Sec-butyl thiolacetohydroxamate | Sec-butyl O-(methylcarbamyl)-thiolacetohydroxamate. |
| Methyl thiolpropionohydroxamate | Methyl O-(methylcarbamyl)-thiolpropionohydroxamate. |
| Isopropyl thiolpropionohydroxamate. | Isopropyl O-(methylcarbamyl)-thiolpropionohydroxamate. |
| Methyl 2-methoxythiolacetohydroxamate. | Methyl O-(methylcarbamyl)-2-methoxythiolacetohydroxamate. |
| Methyl 2-propoxythiolacetohydroxamate. | Methyl O-(methylcarbamyl)-2-propoxythiolacetohydroxamate. |
| Methyl 3-methoxythiolpropionohydroxamate. | Methyl O-(methylcarbamyl)-3-methoxythiolpropionohydroxamate. |
| Methyl 3-ethoxythiolpropionohydroxamate. | Methyl O-(methylcarbamyl)-3-ethoxythiolpropionohydroxamate. |
| Methyl 4-methoxythiolbutyrohydroxamate. | Methyl O-(methylcarbamyl)-4-methoxythiolbutyrohydroxamate. |
| Methyl thiol 2-methylthioacetohydroxamate. | Methyl O-(methylcarbamyl)-thiol-2-(methylthio)acetohydroxamate. |
| Methyl thiol-4-methylthiobutyrohydroxamate. | Methyl O-(methylcarbamyl)-thiol-4-(methylthio)butyrohydroxamate. |
| Methyl thiolethylthioacetohydroxamate. | Methyl O-(methylcarbamyl)-thiol(ethylthio)acetohydroxamate. |
| Methyl thiolisopropylthioacetohydroxamate. | Methyl O-(methylcarbamyl)-thiol(isopropylthio)acetohydroxamate. |
| Ethyl thiolacetohydroxamate | Ethyl O-(methylcarbamyl)-thiolacetohydroxamate. |
| Methyl p-chlorothiolbenzohydroxamate. | Methyl O-(methylcarbamyl)p-chlorothiolbenzohydroxamate. |
| Methyl p-fluorothiolbenzohydroxamate. | Methyl O-(methylcarbamyl)p-fluorothiolbenzohydroxamate. |
| Methyl p-bromothiolbenzohydroxamate. | Methyl O-(methylcarbamyl)p-bromothiolbenzohydroxamate. |
| Methyl p-iodothiolbenzohydroxamate. | Methyl O-(methylcarbamyl)p-iodothiolbenzohydroxamate. |
| Methyl 2-oxo-2-phenylthiolacetohydroxamate. | Methyl O-(methylcarbamyl)2-oxo-2-phenylthiolacetohydroxamate. |
| Isobutyl thiolacetohydroxamate | Isobutyl O-(methylcarbamyl)-thiolacetohydroxamate. |
| Isopropyl thiolacetohydroxamate | Isopropyl O-(methylcarbamyl)-thiolacetohydroxamate. |
| Tert-butyl thiolacetohydroxamate | Tert-butyl O-(methylcarbamyl)-thiolacetohydroxamate. |
| Methyl thiolbutyrohydroxamate | Methyl O-(methylcarbamyl)-thiolbutyrohydroxamate. |
| Isopropyl thiolisobutyrohydroxamate. | Isopropyl O-(methylcarbamyl)-thiolisobutyrohydroxamate. |

The methyl O - (ethylcarbamyl)thiolacetohydroxamate can be prepared by the procedure of Example 2 by substituting an equivalent weight of ethyl isocyanate for the methyl isocyanate and methyl O-(ethylcarbamyl)thiolpropionohydroxamate can be prepared by the same procedure by substituting an equivalent weight of methyl thiolpropionohydroxamate for the methyl thiolacetohydroxamate. Similarly, the following compounds can be prepared by substituting the indicated isocyanate for the methyl isocyanate of Example 2.

| Isocyanate | Product |
| --- | --- |
| n-Propyl isocyanate | Methyl O-(n-propylcarbamyl)-thiolacetohydroxamate. |
| Allyl isocyanate | Methyl O-(allylcarbamyl)-thiolacetohydroxamate. |
| Propargyl isocyanate | Methyl O-(propargylcarbamyl)-thiolacetohydroxamate. |
| 2-butenyl isocyanate | Methyl O-(2-butenylcarbamyl)-thiolacetohydroxamate. |

Example 3

To a stirred suspension of 48 parts of 50% sodium hydride with mineral oil in 730 parts of tetrahydrofuran is added over a one hour period 89 parts of methyl thiolacetohydroxamate. The temperature is maintained at 20–30° C. After gas evolution subsides, 107.5 g. of dimethylcarbamyl chloride is added over a one hour period with the temperature kept between 15 and 25° C. Stirring is continued for one hour at room temperature and the solids are removed by filtration. The solvent is removed under reduced pressure yielding methyl O-(dimethylcarbamyl)thiolacetohydroxamate.

The product, methyl O-(dimethylcarbamyl)thiolacetohydroxamate, is formulated and applied as follows:

|  | Percent |
| --- | --- |
| Methyl O - (dimethylcarbamyl)thiolacetohydroxamate | 50 |
| Sodium alkylnaphthalenesulfonate | 2 |
| Sodium lignosulfonate | 2 |
| Dextrin | 4 |
| Attapulgite | 42 |

The ingredients are blended, coarsely ground through a hammer mill and then passed through a fluid energy mill to produce particles substantially all below 10 microns.

Methyl O - (dimethylcarbamyl)thiolpropionohydroxamate can be prepared by the procedure of Example 3 by substituting an equivalent weight of methyl thiolpropionohydroxamate for the methyl thiolacetohydroxamate.

Example 4

"Nevillac" Hard, a phenol-modified coumarone-indene resin, is melted in a vessel and held at a temperature of between 100 and 110° C. by means of an oil bath. Sufficient methyl O-(methylcarbamyl)thiolacetohydroxamate is added to the molten resin to give a composition containing 12.5% of the methyl O-(methylcarbamyl)thiolacetohydroxamate. The polymer-nematocide melt is stirred efficiently to insure homogeneity and the melt is cooled to room temperature. The resultant brittle solid is formulated as a 10% active wettable powder as follows:

|  | Percent |
| --- | --- |
| Resin - methyl O - (methylcarbamyl)thiolacetohydroxamate composition | 80.0 |
| Montmorillonite | 15.5 |
| Finely divided synthetic silica | 2.0 |
| Sodium lignin sulfonate | 1.0 |
| Dioctyl sodium sulfosuccinate | 1.5 |

The above ingredients are micropulverized to a particle size smaller than 60 mesh. The resulting wettable powder is dispersed in water at a concentration of 25 pounds of powder to 100 gallons of water. The aqueous dispersion is applied at a rate of 3 pounds of active ingredient per acre to land infested with plant-pathogenic nematodes including the southern root-knot nematode (*Meloidogyne incognita*). Cotton plants grown in the treated soil show normal development while plants grown in similar untreated soil shown stunting and reduced yields due to nematode infection.

Example 5

|  | Percent |
| --- | --- |
| Methyl O - (methylcarbamyl)thiolacetohydroxamate | 75.0 |
| Sodium sulfate, anhydrous | 20.0 |
| Finely divided synthetic silica | 4.0 |
| Dioctyl sodium sulfosuccinate | 1.0 |

The above ingredients are blended and screened through a 70 mesh screen and are then reblended. This formulation is dissolved in water, and drenched on the soil over the root zone of boxwood plants infected with the spiral nematode (*Helicotylenchus buxophilus*) at rates of 3 pounds active agent per acre of area treated, using enough water to wash the active agent down about the plant roots. Substantially all spiral nematodes are controlled by this treatment, allowing the boxwood plant to develop in a normal manner. Similarly infested boxwood plants which are left untreated grow poorly and finally die.

Example 6

The water soluble formulation of Example 5 is dissolved in water to give an aqueous system containing 60 p.p.m. of the active ingredient. Narcissus bulbs infested with the bulb and stem nematode (*Ditylenchus dipsaci*) are dipped in this diluted preparation for a period of 10 to 30 minutes. The treated bulbs planted in field soil grow to produce good yields of both cut flowers and new bulbs. Similarly infested bulbs that are not treated grow poorly giving only small yields of both flowers and bulbs.

Example 7

The water soluble formulation of Example 5 is sprayed on selected plots in a strawberry field known to be heavily infested with the bud and leaf nematode (*Aphelenchoides besseyi*). The spray solution contains one pound active of the composition of this invention per 100 gallons of water. The volume of application is such as to provide two pounds of the active ingredient per acre of plot area. All above-ground parts are thoroughly wetted. The strawberry plants in the sprayed plots grow well and give a good yield. In the unsprayed portions of the field, on the other hand, the plants are yellow, grow slowly and produce a poor yield.

Example 8

The water-soluble formulation of Example 5 is added to water at the rate of one-quarter of a pound per 100 gallons. The roots and lower stem of woody nursery stock known to be infested with the lance nematode (*Hoplolaimus coronatus*) are dipped in this solution for three minutes. When stock so treated is planted it grows well and is of good appearance. Similar stock which is not treated grows poorly, is of poor appearance and in many cases does not survive.

Example 9

|  | Percent |
| --- | --- |
| Methyl O - (n - propylcarbamyl)thiolacetohydroxamate | 30.0 |
| Trimethylnonyl polyethylene glycol ether | 5.0 |
| Methyl ethyl ketone | 65.0 |

The above ingredients are combined and stirred to produce a homogeneous solution which is then diluted with water and sprayed at the rate of 15 pounds per acre of active ingredient in 120 gallons of water on a field infested with sugar beet nematode (*Heterodera schachtii*) and the chemical is worked into the soil to a depth of 6 inches. Sugar beets subsequently grown in this field develop normally and are substantially free from infestation by nematodes. In a similarly infested but untreated area in the same field, beets are distorted and yields reduced.

Example 10

| | Percent |
|---|---|
| Sec-butyl O-(methylcarbamyl)thiolacetohydroxamate | 20.0 |
| Trimethylnonyl polyethylene glycol ether | 5.0 |
| Oil-soluble petroleum sulfonate | 5.0 |
| Xylene | 70.0 |

The above formulation, an emulsifiable concentrate, is diluted with sufficient water to drench the soil in the root zone of roses and is applied to roses at a rate of 5 to 15 pounds active agent per acre. Excellent control is obtained of the dagger nematode (*Xiphinema diversicaudatum*) allowing the roses to grow in a normal manner. Similarly infested roses which are not treated grow poorly and have little ornamental value.

Example 11

| | Percent |
|---|---|
| Methyl O-(methylcarbamyl)thiolpropionohydroxamate | 10.0 |
| Granular attapulgite clay (20/40 mesh) | 90.0 |

The above formulation is prepared by fluidizing the active ingredient in a minimum amount of methylene chloride and spraying the fluid onto the attapulgite in a blender. The methylene chloride is then removed by air drying.

The granular product is applied to soil infested with plant-pathogenic nematodes at rates of 15 to 20 pounds of active ingredient per acre using a conventional fertilizer spreader. The granules are then worked into the soil by disking. This treatment gives substantially complete control of the damage caused by a high population of the sting nematode (*Belonolaimus longicaudatus*) as shown by a nematode count 15 days after treatment. In a similar area that remains untreated, the population of the sting nematode continues at a damaging level.

The following compounds, when formulated and applied in a manner similar to that of Example 11, give similar results:

Methyl O-(carbamyl)thiolbutyrohydroxamate
Methyl O-(carbamyl-2-oxo-2-phenylthiolacetohydroxamate
Isopropyl O-(carbamyl)thiolisobutyrohydroxamate
n-Butyl O-(methylcarbamyl)thiolacetohydroxamate
Isopropyl O-(methylcarbamyl)thiolpropionohydroxamate
Methyl-O-(methylcarbamyl)-2-methoxythiolacetohydroxamate
Methyl O-(methylcarbamyl)-2-propoxythiolacetohydroxamate
Methyl O-(methylcarbamyl)-3-methoxythiolpropionohydroxamate
Methyl O-(methylcarbamyl)-3-ethoxythiolacetohydroxamate
Methyl O-(allylcarbamyl)thiolacetohydroxamate
Methyl O-(propargylcarbamyl)thiolpropionohydroxamate
Methyl O-(2-butenylcarbamyl)thiolacetohydroxamate
Methyl O-(methylcarbamyl)-4-methoxythiolbutyrohydroxamate
Methyl O-(methylcarbamyl)thiol-2-methylthioacetohydroxamate
Methyl O-(methylcarbamyl)thiol-4-methylthiobutyrohydroxamate
Methyl O-(methylcarbamyl)thiolethylthioacetohydroxamate
Methyl O-(methylcarbamyl)thiolisopropylthioacetohydroxamate
Methyl O-(methylcarbamyl)-p-iodothiolbenzohydroxamate
Methyl O-(methylcarbamyl)-2-oxo-2-phenylthiolacetohydroxamate
Isobutyl O-(methylcarbamyl)thiolacetohydroxamate
Isopropyl O-(methylcarbamyl)thiolacetohydroxamate
Tert-butyl-O-(methylcarbamyl)thiolacetohydroxamate
Methyl O-(ethylcarbamyl)thiolacetohydroxamate

Example 12

| | Percent |
|---|---|
| Methyl O-(methylcarbamyl)-p-bromothiolbenzohydroxamate | 50.0 |
| Dioctyl sodium sulfosuccinate | 1.5 |
| Methylated cellulose | 1.0 |
| Sodium lignosulfonate | 4.0 |
| Kaolinite | 43.5 |

The above ingredients are blended, coarsely ground through a hammer mill and then passed through a fluid energy mill to produce particles substantially all smaller than 10 microns.

The wettable powder thus prepared is mixed with water and the resulting suspension is sprayed at the rate of 15 pounds per acre of active ingredient in 120 gallons of water on a field infested with the lesion nematode (*Pratylenchus brachyurus*) and the chemical is worked into the soil to a depth of 6 inches. Tobacco grown in this field is substantially free from nematode infestation and yields well, whereas tobacco on a similar but untreated area grows slowly and produces little marketable leaf.

Example 13

For the simultaneous control of the root knot nematode and soil fungi as represented by Pythium spp. and Rhizoctonia spp., the wettable powder formulation of Example 12 is applied in a spray which also contains a wettable powder of 1,4-dichloro-2,5-dimethoxybenzene. For this type of application, 20 pounds active of the formulation of Example 12 and 40 pounds active of 1,4-dichloro-2,5-dimethoxybenzene is added to 100 gallons of water. This mixture is applied as a soil spray by application to a 10-inch band over the row in which cotton is to be planted. The application rate on the row is 60 pounds of total active (20 pounds of the compound of this invention and 40 pounds of 1,4-dichloro-2,5-dimethoxybenzene) per acre of area actually treated. The soil is rotovated immediately thereafter to mix the chemicals thoroughly with the soil. Following this, cotton seed is planted in the treated band. The cotton seedlings which develop are protected against root-knot nematode (*Meloidogyne incognita*) and the fungi Pythium spp. and Rhizoctonia spp. A healthy stand of cotton plants is obtained and at harvest time a high yield of cotton. Where no treatment is applied, the stand is poor, growth is slow and lint yield is reduced.

I claim:

1. A method of protecting plants from plant parasitic nematodes comprising applying to the locus of nematode infestation a plant protectant amount of a compound of the formula:

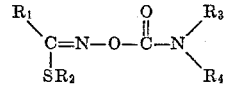

wherein
$R_1$ is alkyl of 1 through 4 carbon atoms, alkoxyalkyl of 2 through 5 carbon atoms, alkylthioalkyl of 2 through 5 carbon atoms, 4-halophenyl or benzoyl;
$R_2$ is alkyl of 1 through 4 carbon atoms;
$R_3$ is hydrogen, methyl, ethyl, propyl, allyl, butenyl, or propargyl; and
$R_4$ is hydrogen or methyl.

2. A method of protecting plants from plant parasitic nematodes comprising applying to the locus of nematode infestation a plant protectant amount of a compound of the formula:

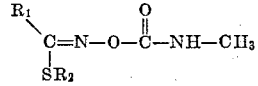

wherein
$R_1$ is alkyl of 1 through 4 carbon atoms, alkoxyalkyl of 2 through 5 carbon atoms, alkylthioalkyl of 2 through 5 carbon atoms, 4-halophenyl or benzoyl; and
$R_2$ is alkyl of 1 through 4 carbon atoms.

3. A method of protecting plants from plant parasitic nematodes comprising applying to nematodes a plant protectant amount of a compound of the formula:

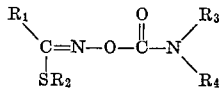

wherein
$R_1$ is alkyl of 1 through 4 carbon atoms, alkoxyalkyl of 2 through 5 carbon atoms, alkylthioalkyl of 2 through 5 carbon atoms, 4-halophenyl or benzoyl;
$R_2$ is alkyl of 1 through 4 carbon atoms;
$R_3$ is hydrogen, methyl, ethyl, propyl, allyl, butenyl, or propargyl; and
$R_4$ is hydrogen or methyl.

4. A method of protecting plants from plant parasitic nematodes comprising applying to nematodes a plant protectant amount of a compound of the formula:

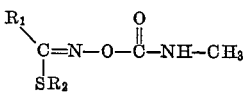

wherein
$R_1$ is alkyl of 1 through 4 carbon atoms, alkoxyalkyl of 2 through 5 carbon atoms, alkylthioalkyl of 2 through 5 carbon atoms, 4-halophenyl or benzoyl; and
$R_2$ is alkyl of 1 through 4 carbon atoms.

5. A method according to claim 3 wherein the compound is methyl O-(allylcarbamyl)thiolacetohydroxamate.

6. A method according to claim 4 wherein the compound is methyl O-(methylcarbamyl)thiolacetohydroxamate.

References Cited

UNITED STATES PATENTS 3,217,037  11/1965  Payne.

ALBERT T. MEYERS, Primary Examiner
S. J. FRIEDMAN, Assistant Examiner